Sept. 24, 1957   G. W. JACKSON   2,807,146
VEHICLE REFRIGERATING APPARATUS
Filed June 22, 1953
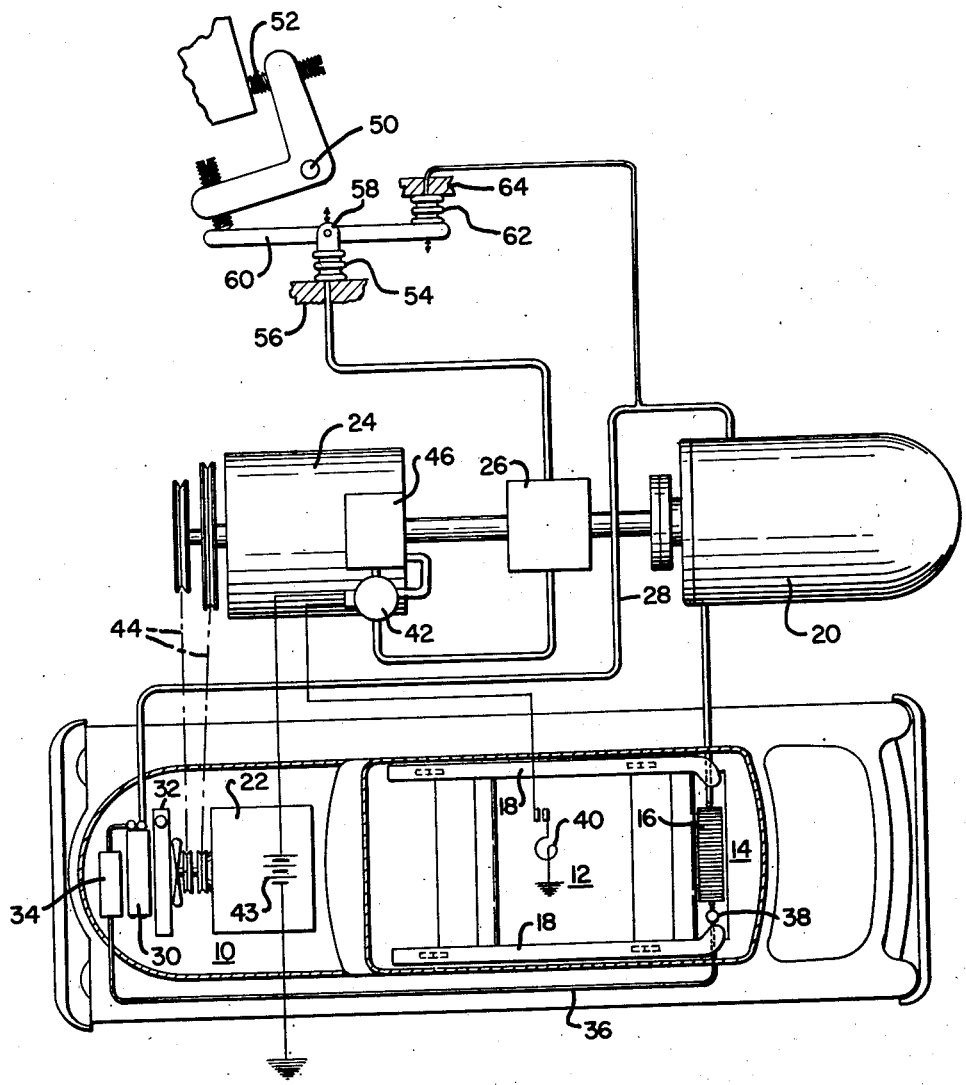
INVENTOR.
George W. Jackson.
BY R. R. Candor.
His Attorney.

United States Patent Office 2,807,146  
Patented Sept. 24, 1957

2,807,146

VEHICLE REFRIGERATING APPARATUS

George W. Jackson, Dayton, Ohio, assignor to General Motors Corporation, Detroit, Mich., a corporation of Delaware Application June 22, 1953, Serial No. 363,313

5 Claims. (Cl. 62—4)

This invention relates to refrigerating apparatus and more particularly to an automobile air conditioning system.

In an automobile air conditioning system wherein the refrigerant compressor is driven from the main car engine through a clutch, the engagement of the clutch throws an added load onto the engine which is sufficient to stall the engine when the engine is operating at idling speeds unless some means is provided for increasing the idling engine speed to compensate for the increasing load.

It is an object of this invention to provide a means for increasing the idling speed of the engine when the compressor starts its operation so as to prevent stalling of the engine.

When the compressor starts under an unloaded condition only a slight increase in the engine speed is required to carry the added compressor load but if the compressor should be started in a loaded condition, a greater increase in the engine idling speed would be required. It is an object of this invention to provide a supplemental control responsive to the load on the compressor to determine the amount of increase to be made in the idling speed of the engine when the compressor starts.

Another object of this invention is to provide an improved automobile air conditioning system which connects the compressor to the car engine in response to temperature conditions within the passenger car.

Still another object of this invention is to provide an improved automobile air conditioning system wherein the compressor speed remains substantially constant as the car engine speed increases.

Further objects and advantages of the present invention will be apparent from the following description, reference being had to the accompanying drawings, wherein a preferred form of the present invention is clearly shown.

The figure in the drawing is a schematic plan view with parts broken away showing an automobile equipped with an air conditioning system embodying my invention.

Referring now to the drawing wherein a preferred embodiment of the invention has been shown, reference numberal 10 generally designates a conventional passenger automobile having an engine compartment 10, a passenger compartment 12 and a luggage compartment 14.

For purposes of illustrating the invention, there is shown an arrangement in which an evaporator 16 mounted in the luggage compartment is used for cooling air which is distributed into the passenger compartment through ducts 18 extending along the sides of the passenger compartment whereas certain aspects of the invention are equally applicable to other evaporator locations and air distributing arrangements. The vaporized refrigerant is withdrawn from the evaporator by a compressor 20 which is adapted to be driven by the main car engine 22 through a conventional variable speed transmission device 24 and a conventional hydraulic clutch 26. The elements 20, 24 and 26 would of course be mounted in the engine compartment of the car but for the sake of clarity have been shown on an enlarged scale at the side of the car. The compressed refrigerant leaves the compressor through the refrigerant line 28 which leads to a condenser 30 mounted directly in front of the main engine radiator 32 so as to be cooled by the incoming air. The refrigerant condensed in the condenser 30 is supplied to a receiver 34 from whence liquid refrigerant is supplied to the evaporator through the liquid line 36 in which there is located a thermostatic expansion valve 38 which controls the flow of refrigerant to the evaporator. The refrigerating circuit thus far described is intended to represent a standard refrigeration system.

A thermostat 40 located in the passenger compartment of the automobile or in any other suitable location where it is capable of responding to refrigeration requirements is used for controlling the operation of the clutch 26. The control system includes a solenoid valve 42 which serves to direct the flow of oil from the oil pump 46 to the hydraulic clutch 26 in such a manner that whenever refrigeration is required the clutch will be engaged and will cause the compressor to be driven from the car engine. In the system illustrated the variable speed drive unit 24 which is provided between the clutch 26 and the car engine 22 serves to drive the compressor at substantially constant speed irrespective of variations in the speed of the car engine. In so far as certain aspects of the invention are concerned the variable speed drive unit 24 may be omitted in which case the compressor would be driven directly from the car engine through some suitable form of clutch such as the hydraulic clutch 26.

Belts 44 connect the main drive shaft of the car engine to the pulleys of the variable speed drive unit 24. The oil pump 46 is driven by the unit 24 and supplies oil under pressure for operating both the clutch 26 and a throttle control mechanism described hereinafter. Since variable speed drive mechanisms and hydraulic clutches are very old in the art and since the construction of these elements may be varied without departing from the spirit of the invention the constructions of these units have not been shown. The electricity for operating the solenoid valve 42 is supplied from the usual car storage battery 43.

Reference numeral 50 designates the usual car engine throttle which regulates the speed of the car engine 22. An adjustable idle stop 52 has been provided for manually adjusting the idling speed of the car engine. In order to automatically increase the idling speed of the engine when the compressor clutch 26 moves into engagement, a bellows 54 has been provided as shown for increasing the idling speed of the car engine in response to the engagement of the clutch. This bellows 54 has its one end carried by a fixed support 56 and has its other end provided with a fulcrum 58 for a lever 60 which engages one arm of the throttle operating bellcrank 50. The arrangement is such that when the solenoid valve 42 opens, the clutch 26 moves into engagement and oil under pressure is also supplied to the bellows 54 so as to step up the idling speed of the engine 22.

A supplemental idling speed control device comprising a bellows 62 which is connected to the discharge line 28 of the refrigerating system is arranged to push down on the one end of the lever 60 in an amount determined by the head pressure and consequently the load on the compressor. The one end of the bellows 62 is mounted on the fixed support 64 as shown.

By virtue of the above described construction and arrangement, the temperature within the conditioned space may be maintained substantially constant by virtue of operation of the thermostat 40 which serves to stop and start the compressor in response to refrigeration requirements. As pointed out hereinabove the gas throttle will be actuated so as to increase the idling speed of the car engine the necessary amount to prevent stalling. The amount of increase in the car engine idling speed is determined by the load on the compressor as reflected by the head pressures in the refrigeration system.

While the form of embodiment of the invention as herein disclosed constitutes a preferred form, it is to be understood that other forms might be adopted, as may come within the scope of the claims which follow.

What is claimed is as follows:

1. In combination with an automobile having wheels and an engine connectable to the wheels for propelling said automobile and having a passenger compartment to be conditioned; a refrigerating system including a compressor, a condenser, and an evaporator connected in refrigerant flow relationship; means for circulating air to be conditioned for said passenger compartment in thermal exchange relationship with said evaporator; power transmitting means connecting said compressor to said engine; said power transmitting means including a clutch; means for varying the speed of said engine to control the speed of the vehicle, said last named means including means for controlling the idling speed of said engine; means operable coincidentally with the engagement of said clutch for increasing the idling speed of said engine; and means responsive to the load on said compressor for determining the amount of said increase.

2. In combination with a vehicle having an engine for propelling said vehicle and having a compartment to be cooled; a refrigerating system including a compressor, a condenser, and an evaporator connected in refrigerant flow relationship; means for circulating air to be cooled for said compartment in thermal exchange relationship with said evaporator; power transmitting means connecting said compressor to said engine; said power transmitting means including a clutch; means for varying the speed of said engine including means for controlling the idling speed of said engine; and means responsive to increase refrigeration requirements for increasing the idling speed of said engine; said last named means including means responsive to high head pressures in said refrigeration system for increasing the idling speed of said engine at high head pressures.

3. In combination, a vehicle having wheels and an engine connectable to the wheels for propelling said vehicle, a refrigerating system for cooling a compartment of said vehicle, said refrigerating system including a compressor, variable speed ratio power transmitting means between said engine and said compressor, said power transmitting means including a clutch, means for controlling the idling speed of said engine, means operable coincidentally with the engagement of said clutch for increasing the idling speed of said engine, and means responsive to pressures within said refrigeration system for controlling the idling speed of said engine.

4. In combination with a vehicle having a compartment to be cooled, a refrigerating system including an evaporator arranged in thermal exchange relationship with air for said compartment, said vehicle having an engine thereon for propelling said vehicle, said refrigerating system including a compressor, torque transmitting means between said engine and said compressor, said torque transmitting means including a clutch, means responsive to refrigerating requirements for operating said clutch, means for regulating the idling speed of said engine, means operable coincidentally with the engagement of said clutch for increasing the idling speed of said engine, and means responsive to refrigerant pressures within said refrigerant system for further controlling the idling speed of said engine.

5. In combination with a vehicle having wheels and an engine connectable to the wheels for propelling the vehicle and having a passenger compartment to be conditioned; a refrigerating system including a compressor, a condenser, and an evaporator connected in refrigerant flow relationship; means for circulating air to be conditioned for said passenger compartment in thermal exchange relationship with said evaporator; power transmitting means connecting said compressor to said engine; means including a throttle for varying the speed of said engine to vary the speed of the vehicle; said last named means including means providing a minimum throttle opening for idling with a disconnected compressor and means operable coincidentally with the operative connection of said power transmitting means for increasing the minimum opening of the throttle means to maintain the necessary idling speed when the compressor is connected to said engine.

References Cited in the file of this patent

UNITED STATES PATENTS

| | | |
|---|---|---|
| 2,264,821 | Zukowski | Dec. 2, 1941 |
| 2,272,973 | Hoesel | Feb. 10, 1942 |
| 2,281,626 | Smith | May 5, 1942 |
| 2,286,758 | Nelson | June 16, 1942 |
| 2,318,893 | Smith | May 11, 1943 |
| 2,475,897 | Iwanski | July 12, 1949 |
| 2,614,396 | Ratermann | Oct. 21, 1952 |
| 2,722,106 | Henny | Nov. 1, 1955 |